United States Patent [19]

Bentley

[11] 4,033,134

[45] July 5, 1977

[54] HEAT ENGINE

[76] Inventor: Arthur P. Bentley, P.O. Box 327, Ulm, Mont. 59485

[22] Filed: June 11, 1976

[21] Appl. No.: 695,062

[52] U.S. Cl. .................................. 60/641; 60/516; 60/525; 60/682; 91/348; 91/419
[51] Int. Cl.² .................... F03G 7/02; F02G 1/04
[58] Field of Search ............ 60/508, 509, 512, 516, 60/517, 525, 641, 650, 682; 91/348, 419

[56] References Cited

UNITED STATES PATENTS

| 2,098,936 | 11/1937 | Armstrong et al. | 91/348 |
| 2,839,888 | 6/1958 | Mallory | 60/514 |

FOREIGN PATENTS OR APPLICATIONS

| 523,269 | 1/1956 | Belgium | 60/525 |

Primary Examiner—Allen M. Ostrager
Assistant Examiner—Stephen F. Husar
Attorney, Agent, or Firm—John A. Robertson

[57] ABSTRACT

A heat engine comprising a cylindrical heat chamber having an end wall of insulating material and on which is mounted a cylinder. An opening in the end wall communicates between the heat chamber and the cylinder. The cylinder is surrounded by a cooling jacket and a piston reciprocates in the cylinder. The end of the cylinder remote from the end wall is open and a connecting rod has one end secured to the cylinder and the other end to a fly wheel. A second rod extends from the cylinder through the opening in the end wall and through another opening in a second end wall in the heat chamber. A disc like valve is slideably mounted on this rod and is moveable into a position opening and closing the opening. Cooperating elements of a dash pot are formed on the piston rod and valve at each end of the latter. A heat sink is provided on the lower side of the heat chamber and a throttle passage extends between the heat chamber and the cylinder. A needle valve cooperates with this passage and is under the control of a governor.

10 Claims, 5 Drawing Figures

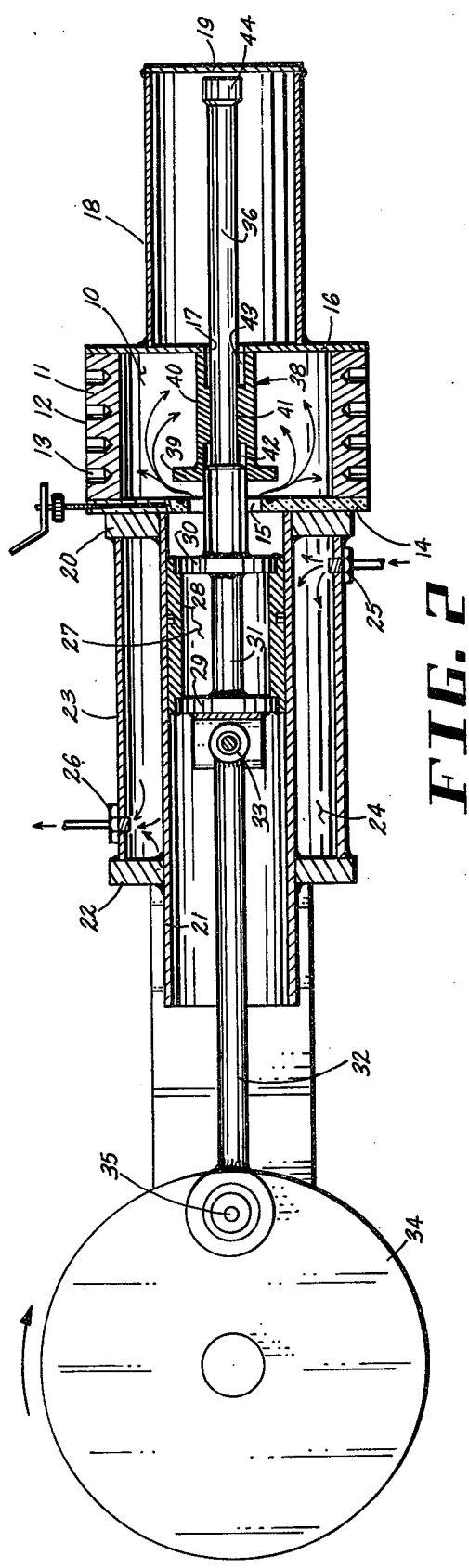
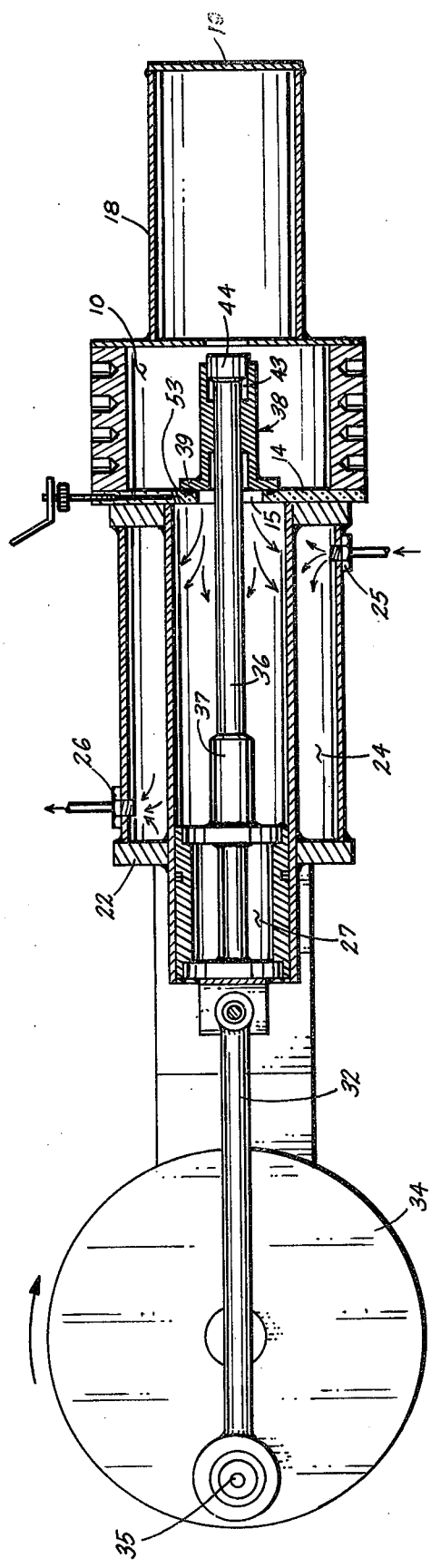

HEAT ENGINE

The present invention relates to heat engines and is concerned primarily with a heat engine in which air is the fluid medium and the engine is particularly designed for heating by solar rays.

BACKGROUND OF THE INVENTION

At the present time the country is confronted with an energy shortage and considerable effort by inventors, engineers, and research workers is being directed to the conversion of solar energy into mechanical power. Heat engines which include air as a fluid medium to cause reciprocation of a piston have long been known. However, while it is suggested that the heat for such engines may be supplied by the sun, the known devices of this character are highly inefficient. The causes of such inefficiency are varied. However, one of them is believed to reside in the fact that the action of the valve which controls an opening between the heat chamber and a piston receiving cylinder, which is typical of most heat engines, is slow and ineffective. If the piston is to reciprocate with a fair degree of repetity this valve must be opened and closed at a similar rate.

In the known engines now available, no provision is made for absorbing the impact of a piston engaging the valve at the completion of a stroke to open it or the engagement of a member with the valve to move it to closed position.

Heat engines now available to the public are notably lacking in a construction which particularly adapts them to be heated by solar rays and in the provision of a governor controlled throttle.

OBJECTS OF THE INVENTION

With the foregoing conditions in mind the present invention has in view the following objectives:

1. To provide a heat engine which includes as characteristic and essential elements a heat chamber defined by a heavy metallic cylindrical wall and two end walls, one of which is of insulating material. The end wall of insulating material is formed with a fairly large central opening and mounted thereon is a cylinder which extends from the end wall and communicates with this opening. A piston is reciprocal in this cylinder and a connecting rod extends from one end of the piston through an open end of the cylinder to a fly wheel. A piston rod extends from the other end of the cylinder through the opening in the insulation wall and also through another opening in the other end wall. A disc valve is slideably mounted on the piston rod within the heat chamber and is moveable into and out of position closing the opening in the insulation wall. Cooperating elements of a dash pot are provided on each side of this valve and the piston rod.

2. To provide, in a heat engine of the type noted, a disc valve which includes a sleeve which extends from one face thereof into the heat chamber and which sleeve has a bore which slideably receives the piston rod. This sleeve is counter bored at each end to provide in cooperation with the piston rod, two annular recesses each of which constitutes an element of a dash pot. The piston rod is formed with a cylindrical enlargement adjacent to the piston which cooperates with one of the recesses to complete a dash pot and the other end of the piston rod is formed with an enlarged head which cooperates with the other of the recesses to complete a dash pot.

3. To provide, in a heat engine of the character aforesaid, a cooling jacket about the cylinder through which a cooling medium is circulated.

4. To provide, in a heat engine of the kind described, a so called heat ring which constitutes the cylindrical wall of the heat chamber and which is formed with a plurality of recesses entering thereinto from its exterior surface to facilitate transfer of heat from the exterior of the ring to the heat chamber.

5. To provide, in a heat engine of the type noted, a heat sink disposed below the lower portion of the heat ring and which stores heat from the sun for operation of the engine when the sun is obscured.

6. To provide, in a heat engine of the character aforesaid, a throttle passage which extends through the insulation wall and communicates with the heat chamber and the cylinder together with a needle valve for controlling the effective diameter of this passage.

7. To provide, in a heat engine of the kind described, a governor for controlling the needle valve.

8. To provide, in a heat engine of the type noted, a system of lenses which are arranged in effective position spaced from the upper half of the heat ring to concentrate rays of the sun thereon from sunrise to sunset.

Various other more detailed objects and advantages of this invention, such as arise in connection with carrying out the above ideas in a practical embodiment will, in part, become apparent and, in part, be hereinafter stated as the description of the invention proceeds.

SUMMARY OF THE INVENTION

The foregoing objects are achieved by providing a heat engine which is particularly designed for operation by air as the fluid medium. The engine includes a heat chamber comprising a thick metallic cylindrical wall having recesses entering thereinto from its external surface throughout its circumferential extent, an end wall of insulating material formed with a large central opening and a second end wall having a smaller central opening in alignment with the opening in the other end wall. A closed cylindrical extension is mounted on the end wall remote from the insulation wall. A cylinder having a bore of a diameter greater than that of the opening in the insulation wall is mounted on the insuluation wall and extends away therefrom to an open end. A cooling jacket is disposed about this cylinder and comprises two rings one of which is adjacent to the insulation wall and the other spaced therefrom together with a cylindrical wall that is spaced from the cylinder. This cylindrical wall is provided with an inlet for a cooling medium such as water and an outlet for the medium.

A piston is reciprocal in the cylinder. A connecting rod has one end pivotally connected to the end of the piston adjacent to the open end of the cylinder, passes through the open end and has its other end pivotally connected to a fly wheel. A piston rod is rigidly connected to the other end of the piston and passes through the openings in the end walls of the heat chamber. This piston rod is formed with a cylindrical enlargement adjacent to the piston and a head at its free end.

A valve comprises a disc of a diameter greater than that of the opening in the insulation wall with which one face of the disc engages. A sleeve is formed integral with the disc and has a bore in which the piston rod is slideably received. This sleeve is counter bored at each end with the counter bores cooperating with the piston rod to define annular recesses each of which constitutes an element of a dash pot. The other element of each dash pot is provided by the enlargement of the piston rod adjacent to the piston and the head on the other end.

A heat sink is provided below the lower half of the heat ring and consists essentially of a pit that is filled with particles of heat absorbing material of which many are known.

A throttle passage is formed in the insulation wall and communicates between that heat chamber and the cylinder. A needle valve is adjustably mounted in the insulation wall to vary the effective bore of the throttle passage. This needle valve may be controlled by a governor.

While the heat chamber may be heated by any appropriate source of heat, this invention has particularly in mind the use of solar energy for this purpose. Thus, a system of lenses is disposed about the upper half of the heat ring and is effective to concentrate sun rays on the heat ring during the daylight hours.

In a modified embodiment the heat chamber includes two walls of insulating material and a second cylinder and cooling jacket is mounted on the end wall in place of the extension is the embodiment previously described. A second piston is reciprocal in this second cylinder and the piston rod extends between the two pistons. The valve comprises two discs connected by a sleeve having a bore which receives the connecting rod and is counter bored at each end. The connecting rod has an enlargement adjacent each piston which cooperates with these counter bores to provide dash pots which are effective to move the valve into and out of open and closed position. Both of the walls of insulating material are formed with throttle passages. A needle valve is associated with each passage and the two needle valves are interlocked and under the control of a governor.

The operation is briefly outlined as follows: With the opening in the insulation wall open, heated air from the heat chamber passes through this opening and due to its tendency to expand urges the piston outwardly. At the completion of this stroke the head on the end of the piston rod enters the counter bore of the valve sleeve to engage the sleeve with dash pot action and move the valve to closed position. The cooling jacket will contract the air in the cylinder and thus create a vacuum which tends to draw the piston inwardly on its return stroke which action is enhanced by the rotation of the fly wheel. As the piston reaches the end of its inward stroke the enlargement on the end of the piston engages the counter bore at the disc end of the valve and unseats it from its engagement with the insulation wall with a dash pot action.

For a full and more complete understanding of the invention, reference may be had to the following description and accompanying drawings wherein:

FIG. 2 is a longitudinal vertical section through the engine of FIG. 1 depicting the position of the piston as it is about to complete an inward stroke and the valve in open position.

FIG. 3 is another longitudinal vertical section similar to FIG. 2 but illustrating the piston at the completion of its outward stroke and the valve in closed position.

DESCRIPTION OF A PREFERRED EMBODIMENT

Figure 1:
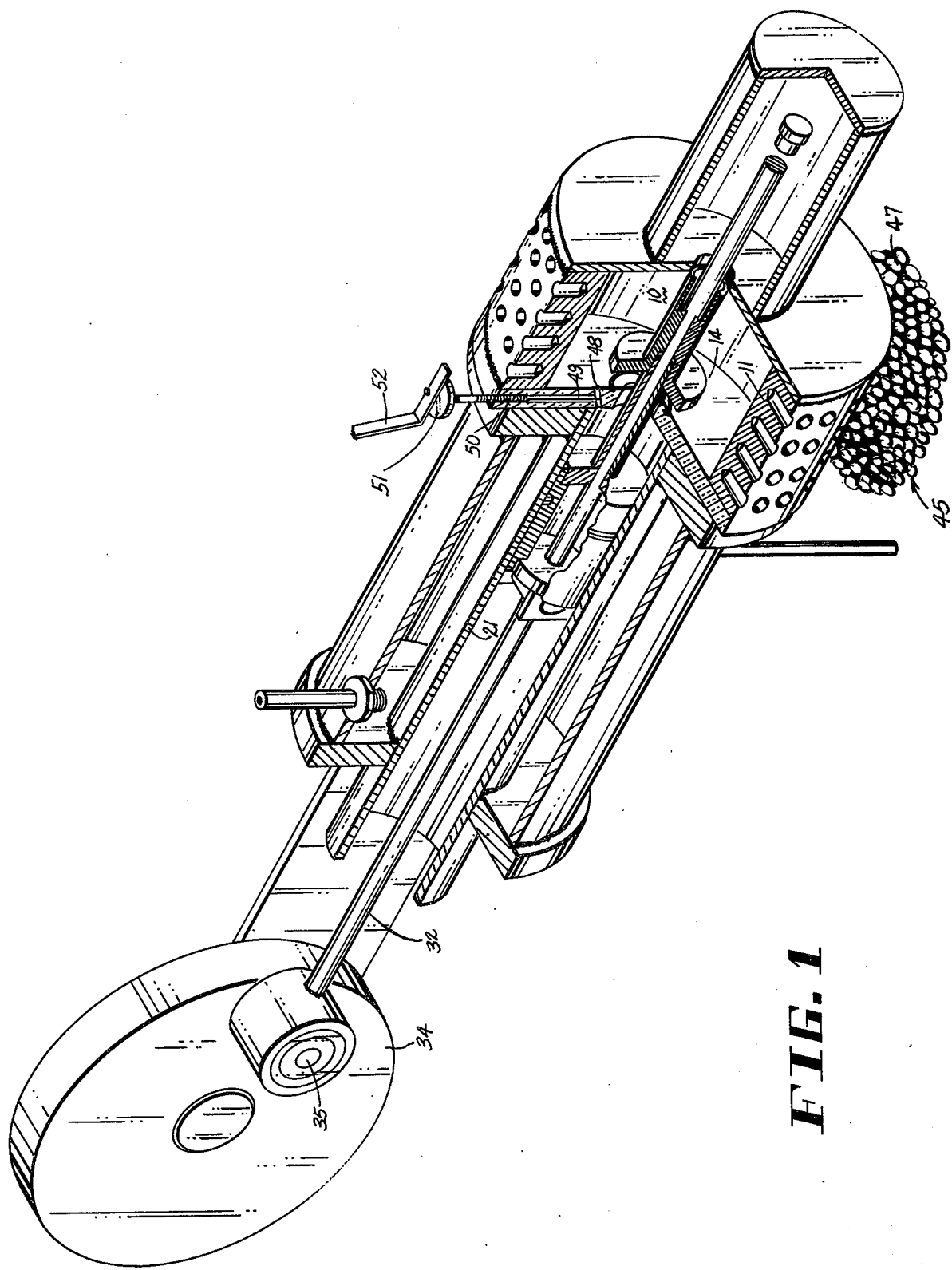
FIG. 1 is a perspective with parts broken away and shown in section of a heat engine embodying the precepts of this invention.

Referring now to the drawings wherein like reference characters denote corresponding elements throughout the several views, and first more particularly to FIGS. 1, 2, and 3, a heat chamber is designated 10. It comprises a heavy metallic ring 11 providing an external surface 12 from which a plurality of recesses 13 enter the ring but stop short of the inner surface thereof. An end wall 14 of heat insulating material is secured to end faces of ring 11 which is hereinafter identified as a heat ring. End wall 14 is formed with a central opening 15. A second end wall 16 which preferably is metallic is secured to the end face of heat ring 11 and has a central opening 17 somewhat smaller than and in alignment with opening 15. A cylinder extension 18 is secured to the outer face of end wall 16 as by welding and its outer end closed by wall 19.

A heavy metallic ring 20 is secured to the outer face of end wall 14. Secured to this ring 20 and extending therefrom is a metallic cylinder 21 the diameter of which is somewhat greater than that of the opening 15. A second metallic ring 22 is mounted on cylinder 21 and a cylindrical wall 23 extends between and is secured to rings 20 and 22. Cylindrical wall 23 is in spaced ralation to cylinder 21 and cooperates with rings 20 and 22 to define a cooling jacket 24. It is intended that a cooling liquid such as water be circulated through jacket 24 hence an inlet is provided at 25 and an outlet at 26.

A piston is identified in its entirety by the reference character 27. It is preferably hollow for weight reduction purposes which is important in reducing the inertia required to reciprocate the piston. Thus, piston 27 comprises a cylindrical body 28 which is closed at both ends by heads 29 and 30. An axial rod 31 extends between the heads 29 and 30.

A connecting rod 32 has one end pivotally connected to piston head 29 as indicated at 33 and its other end to a fly wheel 34 as indicated at 35. A piston rod 36 extends from head 30 through opening 15, heat chamber 10, opening 17, and into extension 18. Adjacent to head 30, piston rod 35 is formed with a cylindrical enlargement 37 which is appreciably smaller than opening 15. A valve is designated generally 38. It comprises a disc 39 having a central opening from which extends a sleeve 40. Sleeve 40 has a bore 41 which slideably receives piston rod 36. Bore 41 is counter bored at 42 and this counter bore is adapted to receive piston rod enlargement 37 with a snug fit whereby the two cooperate to define a dash pot. The other end of bore 41 is also counter bored at 43. It will be noted that sleeve 40 has an external diameter which is greater than that of opening 17 whereby the end face of the sleeve engages the inner face of end wall 16 when the valve is in open position. In such position counter bore 43 aligns with opening 17. Piston rod 36 has a head 44 which is dimensioned to be snugly received in counter bore 43 as illustrated in FIG. 3 to complete a dash pot.

Referring now more particularly to FIG. 1, a heat sink is therein illustrated. It comprises a pit 45 below heat ring 11 which is filled with particles 47 of heat absorbing and retaining material, many of which are well known. Also shown more clearly in FIG. 1, a throttle passage 48 is formed in end wall 14 and communicates between a heat chamber 10 and the interior of cylinder 21. A needle valve 49 is mounted in wall 14 and the upper portion thereof is threaded as indicated at 50 whereby it may be screwed into end wall 14 to vary the effective bore of passage 48. Needle valve 49 has an operating member 51 which may be connected to a governor to be later described, by an arm 52.

OPERATION OF A PREFERRED EMBODIMENT

Assuming that needle valve 49 is properly adjusted and fly wheel 34 is rotating as piston 27 completes an inward stroke, enlargement 37 enters counter bore 42 and compresses the air therein with the well known dash pot action. When this air has reached required degree of compression, disc 39 of valve 38 will literally pop away from the inner face of end wall 14 to clear opening 15. Valve 38 will move into the position of FIG. 2 in which the end face of sleeve 40 engages end wall 16. Heated air in heat chamber 10 will now expand and pass through opening 15 to move piston 27 on its outward stroke. As the piston approaches the end of its outward stroke head 44 of the piston rod enters counter bore 43 to provide a dash pot action which moves valve 38 from the position of FIG. 2 into the position of FIG. 3 in which disc 39 engages the inner face of wall 14. If desired, a sealing ring such as shown at 53 may be embedded in wall 14 on the inner face thereof about opening 15 to provide a good seal.

As piston 27 moves outwardly the air which is drawn into cylinder 21 is subject to the effects of the cooling liquid in jacket 24. Thus it is contracted to create a vacuum condition in the cylinder. This vacuum condition coupled with the rotation of the fly wheel 34 moves the piston inwardly on its inward stroke whereupon the above cycle is repeated.

Figure 5:
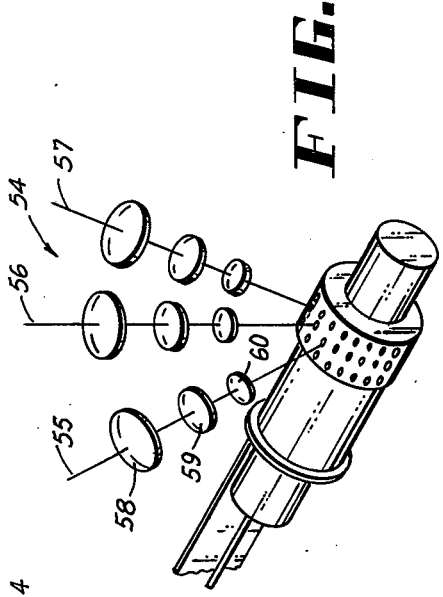
FIG. 5 is a detailed perspective illustrating a lens system somewhat schematically.

It is evident from the foregoing that while the heat chamber 10 is susceptible of being heated by any appropriate source it is particularly designed for being heated by solar energy. To render such heating more effective reference is made to FIG. 5 which diagrammatically illustrates a lens system 54. This lens system comprises three series of lenses 55, 56, and 57. Each of these series includes an outer fresno lens 58, a smaller intermediate lens 59 and an inner lens 60. It is evident that with the sun moving relative to the earth in a clockwise direction with reference to FIG. 5, the lens series 55 will be effective during the morning hours, the series 56 during the median hours, and series 57 during the later hours of the day.

DESCRIPTION OF A MODIFIED EMBODIMENT

Figure 4:
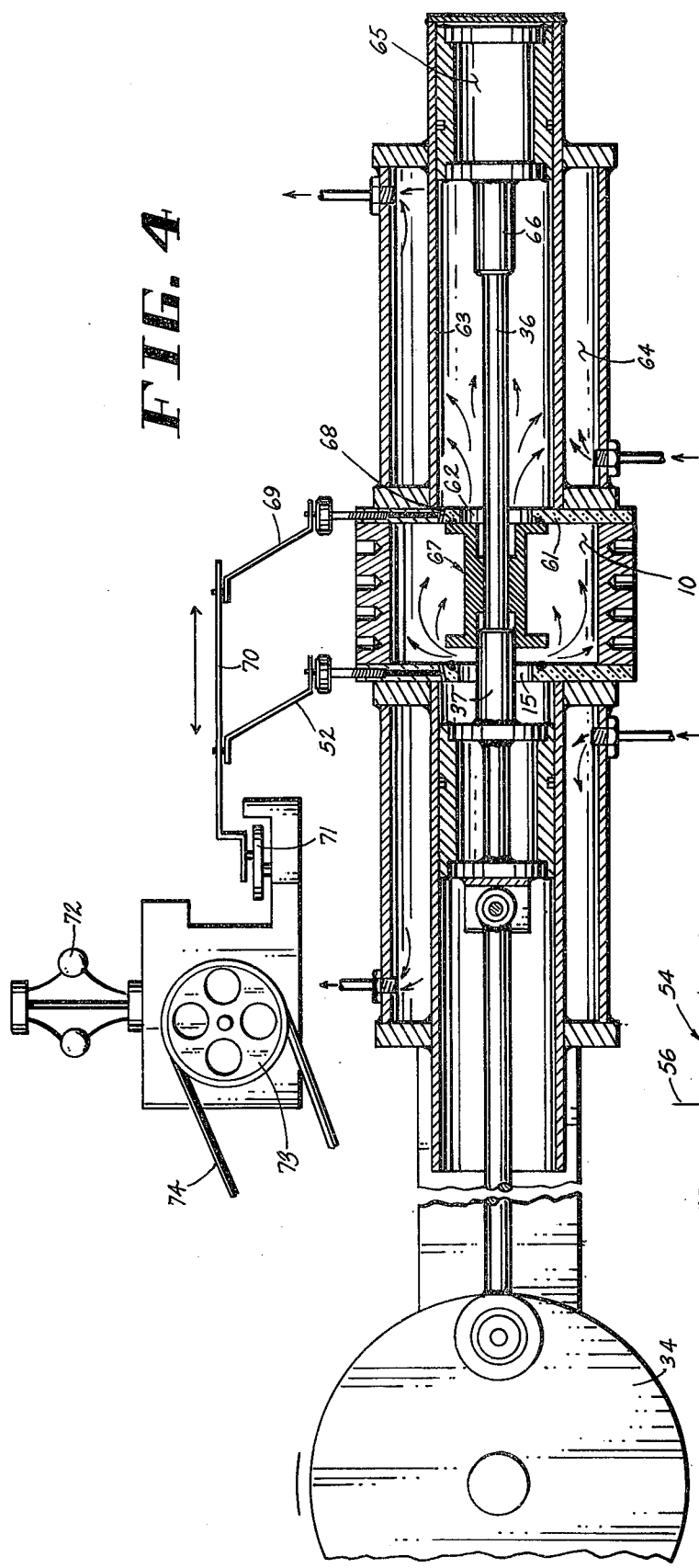
FIG. 4 is a longitudinal vertical section through a modified embodiment and depicting the governor mechansim.

FIG. 4 illustrates an embodiment in which two cylinder and piston assemblies and associated mechanism are mounted on the opposite ends of the heat chamber. Thus, the various elements to the left hand side of heat chamber 10 are the same as illustrated in FIGS. 1, 2, and 3 and described above. However, end wall 16 of FIGS. 1, 2, and 3 is replaced by an end wall 61 of insulating material. This wall is formed with a central opening 62 which corresponds to the opening 15 in end wall 14. A second cylinder 63 is mounted on end wall 62 in exactly the same manner as is cylinder 21 mounted on end wall 14. A cooling jacket 64 is disposed about cylinder 63 in exactly the same way as is the jacket 24 positioned about cylinder 21.

In the embodiment of FIG. 4, piston rod 36 carries a second piston 65 at its end in place of the head 44. It also has an enlargement 66 which corresponds to the enlargement 37 on piston head 30.

Valve 38 is replaced by a spool valve 67 which is counter bored at each end with the enlargement 37 cooperating with one counter bore and the enlargement 66 with the other to provide the dash pot action in moving the spool valve.

End wall 61 is also formed with a throttle passage 68 with which cooperates a needle valve. An arm 69 is operatively connected to needle valve and arms 52 and 69 are interlocked for operation by bar 70. The latter is moved by an eccentric 71 which is acuated by electrical governoring mechanism (not illustrated) which is under the control of ball elements 72 which are rotated by sheave 73 that is driven by drive belt 74 and is connected to fly wheel 34 by connections not herein illustrated which are so well known as to hardly warrant disclosure thereof.

The operation of the modified embodiment is believed to be so obvious in view of the description of the operation of the embodiment of FIGS. 1, 2, and 3, as to hardly warrant a detailed description thereof. It is sufficient to point out that the spool valve 67 is popped into position closing one of the openings 15 or 62 and opening the other and vice versa by the dash pot action provided by the enlargement 57 and 66 and the counter bores in the spool valves.

While preferred specific embodiments of the invention are herein disclosed it is to be clearly understood that the invention is not limited to the exact constructions, mechanisms, and devices illustrated and described because various modifications of these details may be provided in putting the invention into practice.

What is claimed is:
1. In a heat engine in which air constitutes the fluid medium,
    a. a heat chamber defined by a metallic heat ring, a first end wall of heat insulating material formed with a central opening, and a second end wall having a central opening coaxial with the opening in the first end wall;
    b. a closed cylindrical extension mounted on said second end wall about the opening therein and extending away from said heat chamber;
    c. a cylinder mounted on said first end wall about the opening therein, extending away from said first end wall and having an open end;
    d. a cooling jacket about said cylinder and having a liquid inlet and a liquid outlet;
    e. a piston reciprocal in said cylinder and having outer and inner ends;
    f. a connecting rod having one end pivoted to the outer end of said piston and extending through the open end of said cylinder;
    g. a fly wheel to which the other end of said connecting rod is pivotally connected;
    h. a piston rod secured to the inner end of said piston and extending through the opening in the first end wall, the heat chamber, the opening in the second end wall and into said extension;
    i. a valve in said heat chamber having a bore slideably receiving said piston end and moveable into a position closing the opening in the first end wall;
    j. cooperating elements of a first dash pot on the inner end of said piston and said valve which are effective on an inward stroke of the piston to cush- ion impact of the piston with said valve and finally cause the valve to pop into a position clearing the opening in said first end wall;

k. cooperating elements of a second dash pot on said valve and said piston rod at the end thereof remote from said heat chamber;

l. a throttle passage in said first end wall communicating between said heat chamber and said cylinder; and m. adjustable means for varying the effective area of said passage.

2. The heat engine of claim 1 in which the valve comprises a disc having an external diameter greater than that of the opening in the first end wall which it engages to close said opening and a sleeve extending from said disc with said bore extending through said disc and sleeve, the elements of said first dash pot comprise an enlargement on the piston rod adjacent to the inner end of said piston and a counter bore of said bore of the valve extending through said disc and the second dash pot comprises a head on piston rod and a counter bore of said bore at the end of said sleeve remote from said disc.

3. The heat engine of claim 1 in which said heat ring is thick and has a plurality of recesses extending thereinto from its outer surface throughout its circumference.

4. The heat engine of claim 3 together with a heat sink disposed below said heat chamber.

5. The heat engine of claim 3 together with a lens system for concentrating solar rays onto said heat ring.

6. The heat engine of claim 1 in which the means for varying the effective area of said throttle passage takes the form of a needle valve screwed into said first end wall and having a point extending into said passage together with means to rotate said needle valve.

7. The heat engine of claim 1 in which said second wall is of heat insulating material and the extension takes the form of a second cylinder, together with a second cooling jacket about said second cylinder, a second piston on the end of said piston rod in said second cylinder, and the valve takes the form of a spool valve having discs at its opposite ends for alternately closing the openings in the end walls, with the cooperating elements of the two dash pots being connected to the inner ends of said piston and the opposite ends of said spool valve and a second throttle passage in said second end wall communicating between said heat chamber and the second cylinder together with means for varying the effective area of said second passage.

8. The heat engine of claim 7 in which elements of each dash pot comprise an enlargement of said piston rod adjacent to each piston and the other element of each dash pot takes the form of a counter bore at an end of the bore in the spool valve.

9. The heat engine of claim 7 in which the means for varying the effective area of the passage in said second wall takes the form of a second needle valve screwed into said second wall end having a point entering into said second passage together with means for rotating said second needle valve.

10. The heat engine of claim 9 in which the means for rotating the needle valves takes the form of an arm extending from each valve, a bar connected to said arms to interlock their movements, together with a governor that is operatively connected to said fly wheel and said bore.

* * * * *